Figure 1:
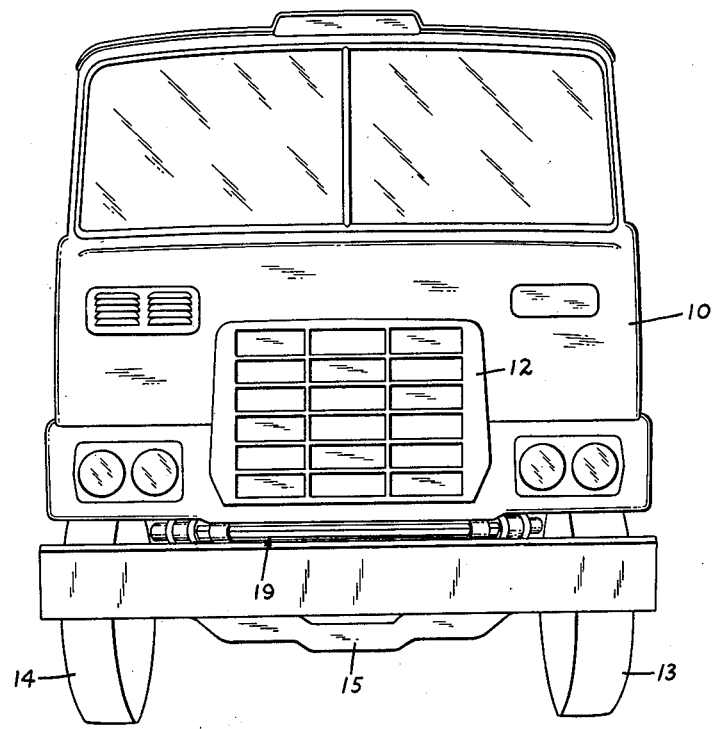

July 13, 1965   R. G. RUTMAN ETAL   3,194,338
INSTRUMENT PANELS FOR VEHICLES
Original Filed Feb. 2, 1962   3 Sheets-Sheet 1

FIG.I.

INVENTORS:
RALPH G. RUTMAN
DONALD M. LOGAN
BY

THEIR ATTORNEYS

July 13, 1965  R. G. RUTMAN ETAL  3,194,338
INSTRUMENT PANELS FOR VEHICLES
Original Filed Feb. 2, 1962  3 Sheets-Sheet 2

INVENTORS.
RALPH G. RUTMAN
DONALD M. LOGAN
BY

THEIR ATTORNEYS

July 13, 1965   R. G. RUTMAN ETAL   3,194,338
INSTRUMENT PANELS FOR VEHICLES
Original Filed Feb. 2, 1962   3 Sheets-Sheet 3

INVENTORS:
RALPH G. RUTMAN
DONALD M. LOGAN
BY

THEIR ATTORNEYS 3,194,338
INSTRUMENT PANELS FOR VEHICLES
Ralph G. Rutman, Allentown, and Donald M. Logan, Emmaus, Pa., assignors to Mack Trucks, Inc., Plainfield, N.J., a corportion of New York
Original application Feb. 2, 1962, Ser. No. 170,571, now Patent No. 3,146,847, dated Sept. 1, 1964. Divided and this application Dec. 10, 1963, Ser. No. 329,453
4 Claims. (Cl. 180—90)

This invention relates to improvements in motor vehicles of the cab-over-engine or tilting cab type and it relates particularly to improvements in cab structures, including instrument panels for such vehicles.

This application is a division of our co-pending application Serial No. 170,571 filed February 2, 1962, and now Patent No. 3,146,847.

In the development of trucks and tractors for hauling trailers, the design and structure of the cab and its relation to the engine and the vehicle frame are dictated and controlled largely by state regulations limiting the overall length of the tractor and trailer combination. In order to keep the length of the vehicles within state regulations and yet have maximum carrying capacity in the trailer, the front to rear and side to side dimensions of the vehicle cab are strictly limited. One way of keeping the cab dimensions relatively small is to mount the cab for tilting movement above the engine of the vehicle.

The present invention relates to improvements in such tilting cab trucks or tractors and especially to arrangements of the instruments in the vehicle in such a manner as to provide improved accessibility and visibility to the driver.

In view of the limited overall length of the cab, and its arrangement over the engine, a tunnel is present in the floor of the cab and serves as a hood covering the upper part of the engine and the engine accessories such as the carburetor, generator and so forth. The tunnel divides the cab substantially in half and is disposed between the driver's and assistant driver's seats. Inasmuch as the driver's side of the vehicle is limited by the presence of the tunnel, particularly when the tunnel is large enough to cover large high displacement engines, the space for such accessories as the instrument panel, the heater and the air distributing system is sharply limited.

In accordance with the present invention, an accessory instrument panel or console is mounted on the tunnel adjacent to the right hand of the driver and is positioned so that it faces him and has control elements such as switches, knobs and the like within easy reach. In this way, the vehicle may have the usual instrument panel directly in front of the driver and in front of the steering wheel and the auxiliary instrument console close to his right hand so that he can observe readings on the dials on the console by turning his head only slightly and at the same time he can reach any knobs, switches, or the like carried by the console to control the various functions of the vehicle.

Figure 2:
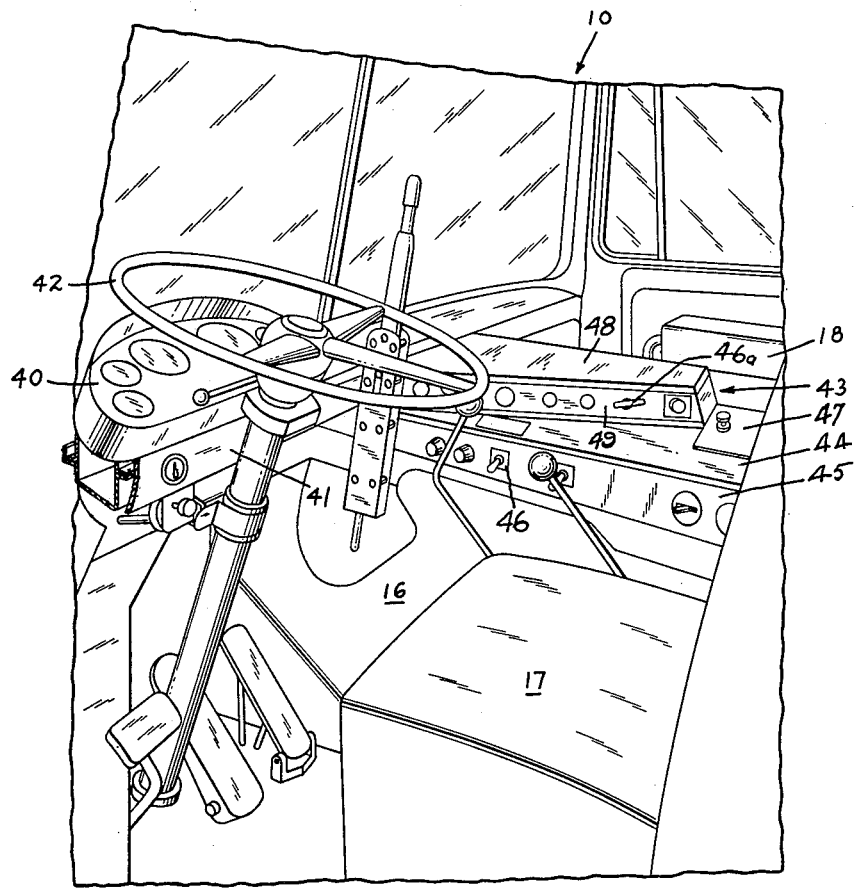
Figure 3:
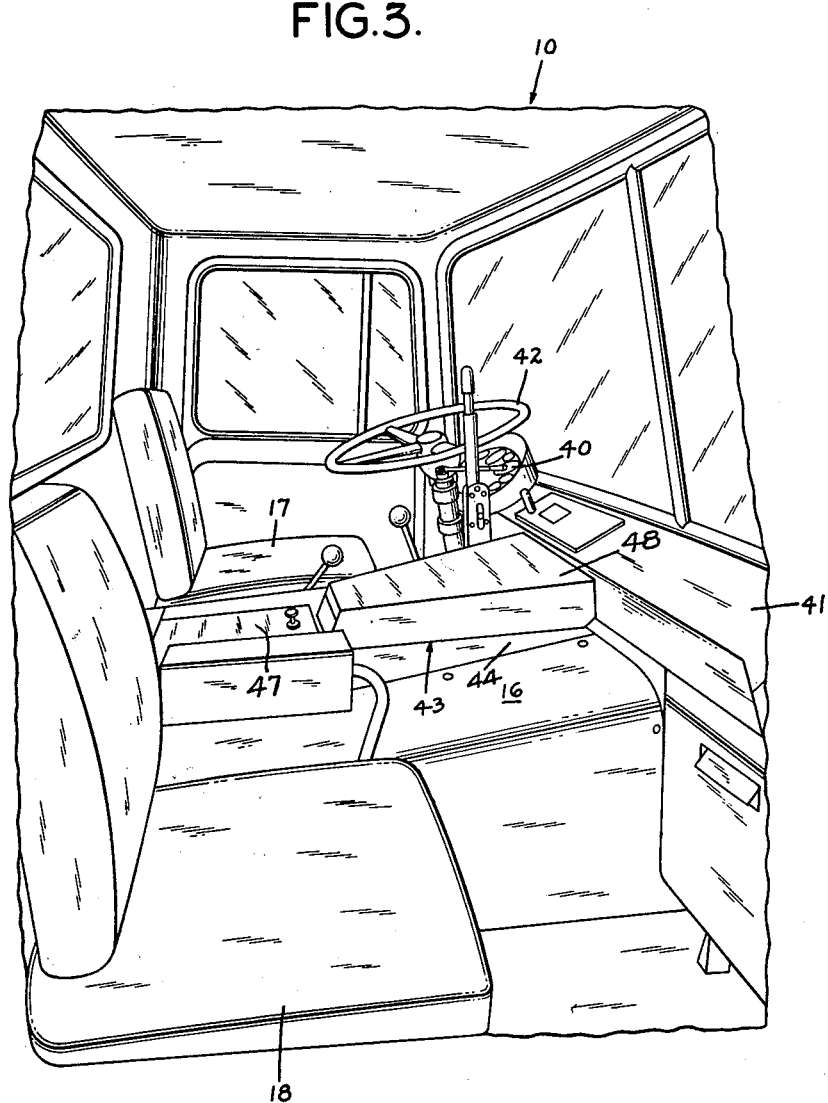

For a better understanding of the present invention, reference may be had to the accompanying drawings in which, FIGURE 1 is a front elevational view of a typical tilting cab vehicle embodying the present invention;

FIGURE 2 is a view in perspective of a portion of the interior of the driver's cab looking into it from the driver's side; and FIGURE 3 is a perspective view of the cab looking into it from the assistant driver's side.

The vehicle chosen for purposes of illustration includes a cab 10 which is hingedly or pivotally mounted at the forward end of a vehicle frame, the engine being disposed at the forward portion of the vehicle behind the grille 12 in the front of the cab.

The frame is supported on the usual front and rear wheels, only the front wheels 13 and 14 and the supporting front axle 15 being shown in the drawings.

Referring to FIGURES 2 and 3, the engine is housed under a tunnel 16 which extends lengthwise of the cab 10 between the driver's seat 17 and the assistant driver's seat 18.

Except as pointed out hereinafter, the frame, engine and cab may be of any of the conventional and well-known types.

A torsion bar counterbalance 19 is provided for mounting the cab 10 on the frame and at least partially balancing its weight to facilitate movement of the cab in a forward tilting direction to uncover the engine and give access to it and a rearward tilting movement to cover the engine and place the cab in position for operating the vehicle.

Advantage is taken of the presence of the tunnel 16 in the cab to make the instrumentation and controls for components of the vehicle more accessible to the driver. FIGURES 2 and 3 show the interior of the cab 10. An instrument panel 40 is mounted on the dash 41 in front of the steering wheel 42 of the vehicle. Due to the complexity of instrumentation of truck and tractor vehicles, a panel large enough to contain all of the instrumentation would extend too far to the right over the tunnel and would therefore be inconvenient and inaccessible to the driver.

In accordance with the present invention, a separate console or housing 43 is mounted on top of the tunnel and behind the dash 41. The console shown is a hollow casing 44 which extends lengthwise of the tunnel 16 and an instrument panel 45 on the driver's side thereof in which a plurality of switches 46 and other controls are mounted. A glove compartment having a lid 47 is formed in the rear end of the console. On top of the console 44 is another console portion or housing 48 of tapering width having a panel 49 inclined rearwardly so that it faces toward the driver. Switches 46a and other controls are mounted on the panel 49. The wiring and other connections are housed at least patrially in the console 43. Inasmuch as the console is positioned adjacent to the driver's side of the tunnel with the panels 45 and 49 facing toward him, the driver merely has to turn his head slightly to see the panel. All of the control switches, knobs, etc., are within easy reach of his right hand without interference. By making the console 43 of suitable shape and size, a great many controls and instruments and associated equipment can be mounted within the console for easy servicing by removing the panels 45 and 49 or the entire console.

From the foregoing description of a typical vehicle embodying the present invention it will be apparent that an improved and useful arrangement of elements is obtained which not only affords comfort and convenience to the driver within a limited area, but also enables easier servicing of the engine.

It will be understood that the design, the appearance, and the arrangement of the elements of the cab, the construction of the truck frame and the type of engine used are susceptible to considerable variation. Therefore, the form of the invention disclosed herein should be considered as illustrative.

We claim:
1. In a vehicle having a frame, an engine mounted in said frame and a driver's cab mounted on said frame having a raised tunnel in the floor thereof overlying said engine; the combination therewith of a low, elongated console mounted on and extending lengthwise of said tunnel, an instrument panel mounted on one side of said console facing said driver, and operating elements and dials mounted on said panel visible and accessible to said driver.

2. A vehicle comprising a driver's cab, a tunnel extending lengthwise of said cab, a driver's seat in said cab adjacent to one side of said tunnel, a steering wheel in front of said driver's seat, a first instrument panel in said cab in front of said steering wheel, and an elongated second instrument panel mounted on and extending lengthwise of said tunnel adjacent to said driver's seat and instruments on said panel facing said driver's seat and accessible to said driver.

3. A vehicle comprising a driver's cab, a tunnel extending lengthwise of said cab, a driver's seat and an assistant driver's seat on opposite sides of said tunnel, a steering wheel in front of said driver's seat, a first low, elongated housing on and extending lengthwise of and upwardly from said tunnel, a first instrument panel on a side of said first housing facing and accessible to said driver, a second low, elongated housing on top and extending lengthwise of said first housing, and a second instrument panel on one side of said second housing and facing toward the driver's seat.

4. The vehicle set forth in claim 3 in which the second instrument panel is disposed in a plane inclined to the centerline of said tunnel.

References Cited by the Examiner
UNITED STATES PATENTS

| | | | |
|---|---|---|---|
| 2,088,787 | 8/37 | Gregorie | 180—90 X |
| 2,091,059 | 8/37 | Tjaarda | 180—90 |
| 2,154,011 | 4/39 | Reinoehl et al. | 180—89 X |
| 2,798,568 | 7/57 | Zeller | 180—89 |
| 2,876,857 | 3/59 | Beyerstedt | 180—90 |
| 3,022,107 | 2/62 | Daniels | 296—37 |

A. HARRY LEVY, *Primary Examiner.*